US005841676A

United States Patent [19]
Ali et al.

[11] Patent Number: 5,841,676
[45] Date of Patent: Nov. 24, 1998

[54] SYSTEM AND METHOD FOR ESTIMATING A CHANGE POINT TIME IN A MANUFACTURING PROCESS

[75] Inventors: Fatma Ozden Gur Ali, Schenectady; Frederick William Faltin, Ballston; Necip Doganaksoy, Clifton Park, all of N.Y.

[73] Assignee: General Electric Company, Schenectady, N.Y.

[21] Appl. No.: 743,069

[22] Filed: Nov. 4, 1996

[51] Int. Cl.[6] .................................................. G06F 17/60
[52] U.S. Cl. ...................................... 364/552; 364/468.16
[58] Field of Search ..................... 364/552, 554, 364/551.01, 468.15, 468.16, 468.17, 468.18

[56] References Cited

U.S. PATENT DOCUMENTS

| 5,191,313 | 3/1993 | Galbraith | 340/501 |
|---|---|---|---|
| 5,225,998 | 7/1993 | Singhal | 364/554 |
| 5,257,206 | 10/1993 | Hanson | 364/502 |
| 5,284,164 | 2/1994 | Andrews et al. | 364/552 |
| 5,311,759 | 5/1994 | Mangrulkar et al. | 364/552 |
| 5,339,257 | 8/1994 | Layden et al. | 364/552 |
| 5,351,202 | 9/1994 | Kurtzberg et al. | 364/552 |
| 5,397,872 | 3/1995 | Baker et al. | 219/109 |
| 5,408,405 | 4/1995 | Mozumder et al. | 364/552 |
| 5,423,199 | 6/1995 | Mangrulkar | 364/552 |
| 5,440,478 | 8/1995 | Fisher et al. | 364/552 |
| 5,442,562 | 8/1995 | Hopkins et al. | 364/468 |
| 5,532,941 | 7/1996 | Lin | 364/552 |

OTHER PUBLICATIONS

"Nonparametric Change–Point Estimation" By E. Carlstein, The Annals of Statistics 1988, vol. 16, No. 1, pp. 188–197.

"Edge–Preserving and Peak–Preserving Smoothing" By Peter Hall, et al, Technometrics, Nov. 1992, vol. 34, No. 4, pp. 429–440.

"Nonparametric Tests for Shift at an Unknown Time Point" By G.K. Bhattacharyya, et al, The Annals of Mathematic Statistics 1968, vol. 39, No. 5, pp. 1731–1743.

Joseph M. Juran, "Quality Control Handbook", McGraw–Hill Book Company, Third Edition (1974), Chapter 9 (pp. 9–1 to 9–51), Chapter 23 (pp. 23–1 to 23–35), and Chapter 41 (pp. 41–1 to 41–21).

Harvard Business School Publication 9–686–118, "Constructing and Using Process Control Charts for Statistical Process Control", Revised Oct. 1987, pp. 1–17.

Emmanuel P. Papadakis, "On–Line Statistical Process Control with NDE and Computers", 1988 IEEE Ultrasonics Symposium, pp. 523–527.

Cirulli et al., "A Successful Strategy for Implementing Statistical Process Controls", IEEE/CHMT 1989 IEMT Symposium, pp. 96–98.

Shindo et al., "A Study for Designing QC Information System", IEEE/CHMT 1989 Japan IEMT Symposium, pp. 356–359.

Brian A. Nugent, "SPC in Short Run Processes", IEEE 1990 National Aerospace and Electronics Conference, pp. 1304–1307.

(List continued on next page.)

*Primary Examiner*—Eric W. Stamber
*Attorney, Agent, or Firm*—David C. Goldman; Marvin Snyder

[57] ABSTRACT

The present invention discloses a system and method for estimating a change point time in a manufacturing process. The change point estimate is estimated by a change point estimator after receiving an alarm from a statistical process control chart. The change point estimate is estimated by estimating the point of a process before and after a particular point in time and declaring the point with the maximum absolute difference to be the change point time. In the present invention there are three versions for estimating the change point estimate. After estimating the change point time any other likely change point times are then determined and used to match the dates of those changes to any possible changes in the product variables that occurred during the manufacturing process. A source causing the change in the process is then identified, allowing an engineer to provide the necessary corrective action to remedy the change.

12 Claims, 3 Drawing Sheets

OTHER PUBLICATIONS

Mark Shewhart, "Interpreting Statistical Process Control (SPC) Charts Using Machine Learning and Expert System Techniques", IEEE 1992 National Aerospace and Electronics Conference, pp. 1001–1006.

Ho et al., "Improving Product Quality in a Pulp Mill Using Statistical Process Control (SPC)", IEEE 1993 Canadian Conference on Electrical and Computer Engineering, pp. 953–957.

William L. Nolte, "SPC with Enable", IEEE 1994 International Engineering Management Conference, pp. 170–176.

Stephen V. Crowder, "A Simple Method for Studying Run–Length Distributions of Exponentially Weighted Moving Average Charts", Technometrics, Nov. 1987, vol. 29, No. 4, pp. 401–407.

Doganaksoy et al., "Identification of Out of Control Quality Characteristics in a Multivariate Manufacturing Enviroment", Commun. Statist. Theory Meth., 20(9), 1991, pp. 2775–2790.

J. Stuart Hunter, "The Exponentially Weighted Moving Average", Journal of Quality Technology, vol. 18, No. 4, Oct. 1986, pp. 203–209.

SYSTEM AND METHOD FOR ESTIMATING A CHANGE POINT TIME IN A MANUFACTURING PROCESS

BACKGROUND OF THE INVENTION

The present invention relates generally to manufacturing processes, and more particularly to monitoring and estimating change point times in manufacturing processes.

In most manufacturing environments, there are factors which determine properties of a manufactured product. For example, in a plastic extrusion process, the factors are grade (i.e., composition of the mixing materials), color (i.e., amounts of pigments used) and production equipment. A change in manufacturing conditions impacting any one of these factors will change the properties of the compounded plastic. Another example is in a turbine blade grinding operation wherein several grinding machines and fixtures are used to grind different types of blades. A change in a machine or a fixture will impact the dimensions of the processed blade. In these manufacturing processes, key product properties are monitored by statistical process control charts to detect changes in a timely manner.

An example of this problem is in the extrusion process that manufactures various grades of an engineering plastic on multiple extrusion lines. In such an extrusion process, various grades and colors of a plastic product are typically produced in lots, with each lot processing a single grade of material, one lot at a time. The grades for each product typically differ in composition, processing, and performance properties. Product quality for the grades often depends upon multiple factors such as manufacturing equipment, feedstock properties, and laboratory equipment. Product quality is effected if changes to these factors are not readily detected. Control charts are frequently used for detecting a shift in the process level. Once a shift is detected, it is important to find a cause for the shift so that the engineer monitoring the extrusion process can take the proper corrective action necessary to correct the cause of the shift. One method currently being used to determine the cause of a shift in an extrusion process is by identifying the change point time that the shift occurred. However, current methods of estimating change point times have several drawbacks. One drawback is that the current methods require that a distribution function of the observations be known. Another drawback is that the current methods involve complex calculations. Another drawback is that the current methods do not provide protection from false alarms. For example, alarms may be issued frequently even if there is no statistically significant change. Still another drawback is that the current methods are not as powerful in terms of high accuracy. Yet another disadvantage is that the current methods assume that the change point time can be only in the mean and not in the variance.

SUMMARY OF THE INVENTION

The present invention has overcome the above-mentioned problems by estimating the level of a process before and after a particular point in time and declaring the point with the maximum absolute difference to be the change point time. More specifically, the change point time is estimated by using one of three estimates. One estimate takes the average of points before and after a considered point, wherein the point with the maximum absolute difference between the average of points before and after is the change point time. Another estimate takes the exponentially weighted moving average (EWMA) of points before and after the considered point, wherein the point with the maximum absolute difference between the (EWMA) of points before and after is the change point time. The third estimate takes the (EWMA) of points before the considered point and the average after the point, wherein the point with the maximum absolute difference between the (EWMA) of points before and the average after is the change point time.

In accordance with the present invention, there is provided a system and method for estimating a change point time in a manufacturing process producing various products made on multiple lines in several lots. In the present invention, a test device measures a plurality of product variables representing various properties of the manufactured products for each product made on a line in a lot. A storage device stores the plurality of measured properties from the testing device in various groupings of lots, products, and lines. A detector detects changes occurring in the groupings of properties in the storage device for each product made on a line in a lot. The detector comprises at least one control chart containing control limits for each respective grouping. The detector combines the measured properties in each grouping and determines if a control limit has been exceeded for any product made on a line in a lot. A change point estimator estimates a change point time for each grouping that has exceeded a control limit. The change point time indicates when a process change occurred causing subsequently the control limit to be exceeded. The change point estimator estimates the change point time by estimating each point of the process before and after a particular point in time with a combination of an EWMA and an average, and finds the point with the maximum absolute difference. A diagnostic analyzer coupled to the detector and the change point estimator helps identify sources causing the control limit to be exceeded and provides a basis for selecting actions to correct the sources.

While the present invention will hereinafter be described in connection with a preferred embodiment and a system and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Although the present invention is described with reference to the manufacture of a plastic compound, it should not be limited to this specific operation, but instead may be used with many manufacturing processes, regardless of the product being produced.

Figure 1:
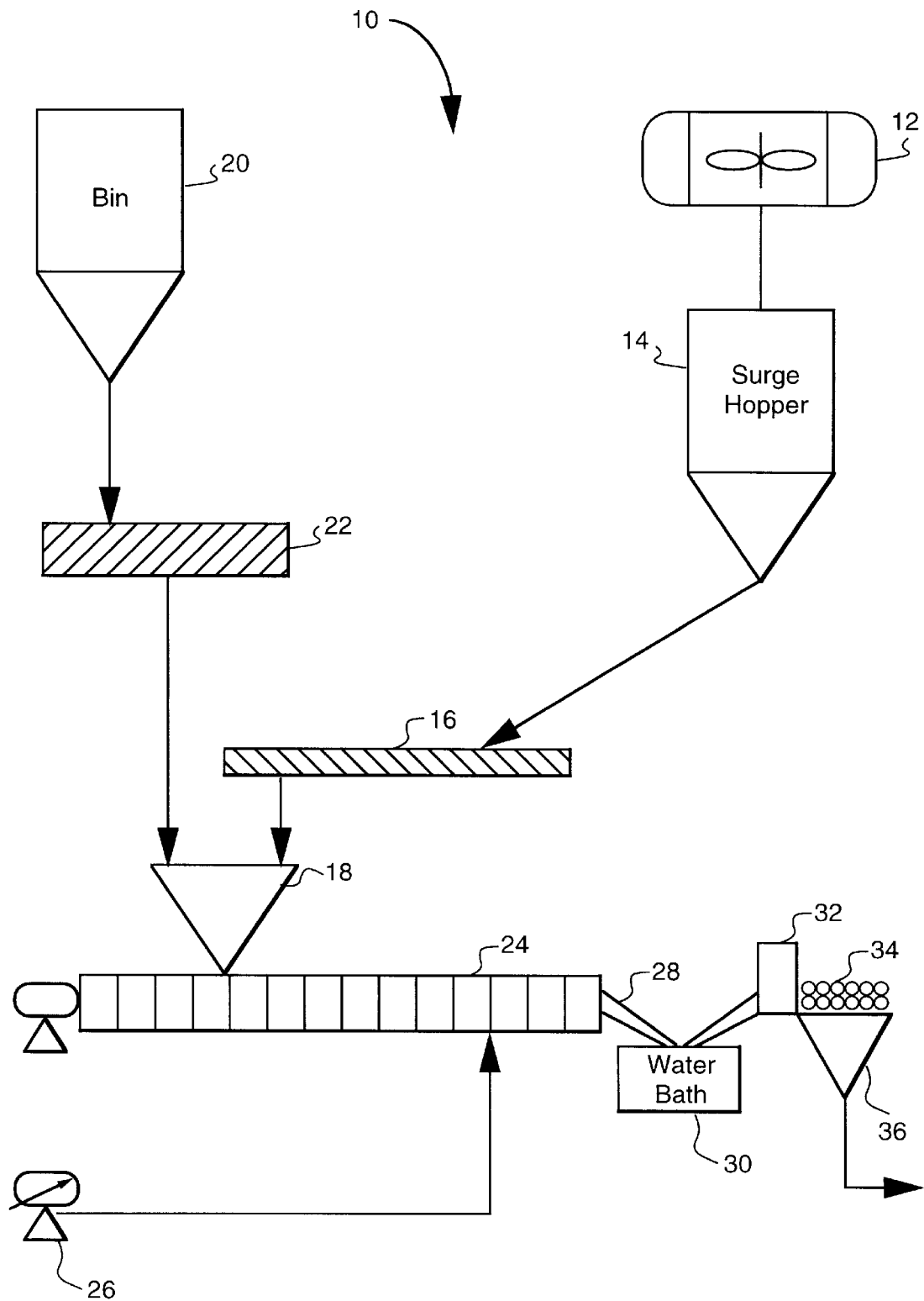
FIG. 1 is a schematic of a process used to manufacture a plastic resin compound.

FIG. 1 shows a schematic of a process 10 used to manufacture a plastic resin compound. In the manufacturing process, a plastic resin is blended with pigment additives in a blender 12 and temporarily stored in a surge hopper 14. The blend of pigments and the resin is then delivered to a feeder 16. The blend is then delivered to a hopper 18 and mixed with a second plastic resin. The second plastic resin is delivered from a bin 20 and a belt feeder 22. The two plastic resins are sent to an extruder 24 and mixed together to form a miscible blend. Flame retardant is injected into the blend by a pump 26. The extruder sends strands 28 of the miscible blend into a water bath 30 for cooling. A pelletizer 32 cuts the strands into pellets 34, which are then sent to a hopper 36 for temporary storage and later packaging.

Figure 2:
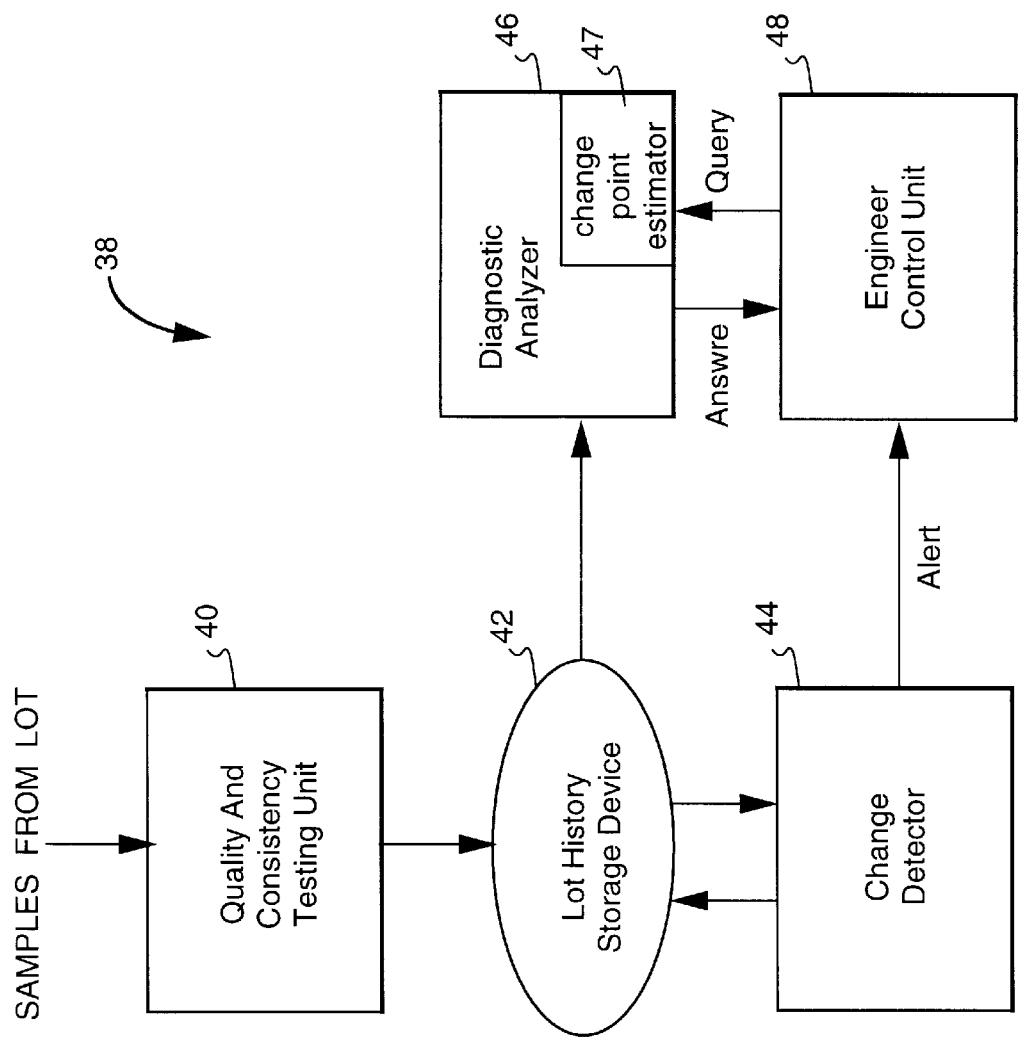
FIG. 2 is a block diagram of the monitoring system used in the present invention.

The manufacturing process 10 is monitored by a monitoring system 38 shown in the block diagram of FIG. 2. The monitoring system includes a quality and consistency testing unit 40 for monitoring the electrical performance of the extruder 24 and assuring that the processing conditions are at a desired point. In addition, the quality and consistency testing unit receives samples of pellets from the hopper 36 after each lot is finished and tests the samples for various properties such as heat distortion temperature, notched impact, tensile elongation, strength, flexural modulation, and flexural yield.

After the lot has been tested, the data from the quality and consistency testing unit 40 is downloaded into a lot history storage device 42 and arranged for processing. In particular, the lot history storage device arranges the data into statistical process control charts having categories such as grade, color, production line, date of production, physical properties, physical property values, and standardized physical property values and limits. EWMA, Shewhart, and other equivalent control charts can be used.

The control charts are used to smooth data and clarify trends. Data generated from each lot contributes to each of these charts. In the example shown in Table 1, there are eight types of EWMA charts. For instance, there is a global chart which determines the EWMA for all data regardless of the line, grade, and color. The second chart is grade specific, determining EWMAs for a specific grade in all grades and colors. The third chart is color specific, determining EWMAs for a specific color in all lines and grades. The fourth chart is grade-color specific, determining EWMAs for a specific grade and color in all lines. The fifth chart is line specific, determining EWMAs for a specific line in all colors and grades. The sixth chart is line-grade specific, determining EWMAs for a specific grade and line in all colors. The seventh chart is line-color specific, determining EWMAs for a specific line and grade in all grades. The eighth chart is line-grade-color specific, determining EWMAs for a specific line, grade and color.

TABLE 1

Data Views and Chart Types

| TYPE OF CHART | LINE COVERAGE | GRADE COVERAGE | COLOR COVERAGE |
|---|---|---|---|
| Global | All | All | All |
| Grade Specific | All | Specific Grade | All |
| Color Specific | All | All | Specific Color |
| Grade-Color Specific | All | Specific Grade | Specific Color |
| Line Specific | Specific Line | All | All |
| Line-Grade Specific | Specific Line | Specific Grade | All |
| Line-Color Specific | Specific Line | All | Specific Color |
| Line-Grade-Color Specific | Specific Line | Specific Grade | Specific Color |

The EWMAs for each of the eight views are determined by using the following formula:

$$EWMA_{New} = \lambda Data_{New} + (1-\lambda) EWMA_{old},$$

where $\lambda$ is a smoothing constant having a range of $0 < \lambda < 1$, with the preferred range being $0 < \lambda \leq 0.3$.

Before the data from the multiple products in each lot are combined, the data is normalized.

$$\text{Normalization} = \frac{\text{Product Measurement} - \text{Product Mean}}{\text{Product Standard Deviation}},$$

where the mean and standard deviation are calculated from previously stored data. The initial value of an EWMA is usually zero when normalized data is used.

Each of the process charts have a set of signal limits that indicate when the EWMA has moved appreciably from its target value (i.e., product mean). Such movements of the EWMA is indicative of changes in the physical property data being charted. The EWMA signal limits for normalized data are defined as:

$$EWMA \text{ SIGNAL LIMITS} = \pm L \sqrt{\frac{\lambda}{2-\lambda}} \text{ (Standard Deviation)}, \quad (3)$$

where L has a useful range of $1.5 \leq L \leq 4.5$ and if standardized data is used, the standard deviation is equal to one. It will be appreciated by skilled artisans that values for L and $\lambda$ can be determined by conducting an extensive Monte Carlo simulation study.

The data in the lot history storage device 42 is sent to a change detector 44 and processed to detect changes that are occurring in the lots. In particular, changes that impact all products and changes that impact only a small subset of products are detected in a timely manner. In the present invention, the change detector and the lot history storage device are preferably embodied in a VAX computer. The change detector 44 does an analysis of the data whenever the data is downloaded from the quality and consistency testing unit to the lot history storage device 42. Every time a new product property data value is added, EWMAs are determined for all eight groupings as shown in Table 1 and compared with their respective limits, and these results are put back into the lot history 42 for later reference. A more detailed discussion on determining EWMA's for each lot for a particular line, grade, and color is provided in abandoned U.S. patent application Ser. No. 08/336,036, entitled System and Method For Monitoring a Multi-Factor Manufacturing Process, which is incorporated herein by reference.

If a significant change is noted, then an alarm is sent to the engineer control unit 48 alerting the engineer of any changes that occur. As a consequence, a typical disturbance or change often causes multiple alarms to occur over a short period of time. The engineer then interacts with a diagnostic analyzer 46 to explore the meaning of the alarm messages. The diagnostic analyzer, preferably a personal computer or a workstation, provides flexible tools to localize a change to a specific product family, manufacturing line, to help identify the change point time or the time when the change started; thus providing guidance for maintenance actions to correct the changes. Interpretation of the alarm is necessary in order for the engineer to determine whether all products are affected, or only certain grades or colors are affected, or whether the alarm occurred as a result of a statistical phenomenon without changing the manufacturing process.

Figure 3:
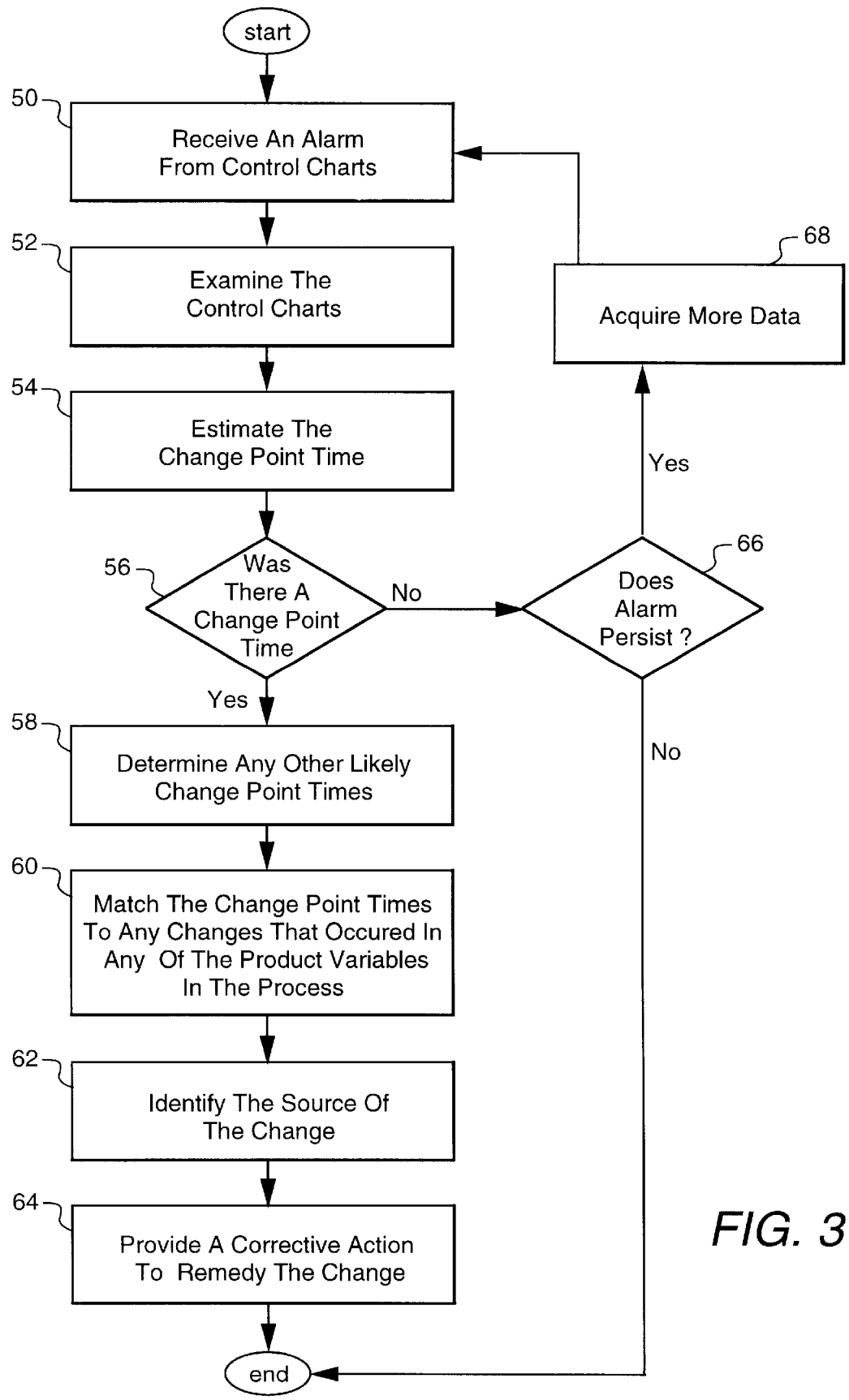
FIG. 3 is a flow chart describing a sequence of steps followed in the present invention.

Upon receiving the alarms, the engineer plots the physical property data causing the alarms with the diagnostic analyzer 46 showing the EWMA trend and limits. Next, the engineer uses a change point estimator 47 that is located within the diagnostic analyzer 46 to estimate the change point time. The change point estimator follows a sequence of steps provided in the flow chart of FIG. 3. Initially, at step 50, the process control chart(s) generating the alarm(s) are received and examined at 52. In particular, the change point estimator 47 decides at 52 when the change in the process occurred that caused the control chart(s) to alarm subsequently by estimating the change point time at 54. In the present invention there are three versions that are used to estimate the change point time. A more detailed discussion on each version is provided below. After the estimation of the change point time, the change point estimator evaluates the estimation at 56 to decide whether there was actually a change point time or whether the alarm was just a statistical phenomenon. A statistical phenomenon may occur when the limits that trigger the alarms are set at certain confidence levels, which in the long run can give alarms although the underlying distribution has not changed. If there was a change point time, then the change point estimator determines whether there are any other likely change point times at 58. The candidates of other likely change point times are then used at 60 to match the dates of these change point times to any possible changes in the product variables that occurred during the manufacturing process. The change point estimator then identifies a source causing the change in the process at 62. At 64, the engineer is expected to determine a corrective action to remedy the change. If there was no change point time at 56, then the change point estimator inquires at 66 whether the alarm continues to register. If the alarm does persist, then the change point estimator waits for more data to be acquired at 68 and repeats the above analysis starting at block 52. Otherwise, the algorithm run by the change point estimator ends.

In order to estimate the change point time in accordance with the present invention, it is assumed that observations up to the change point $\tau$, are identically and independently distributed (iid) with a mean $\mu_0$ and variance $\sigma_0$. The observations at and after $\tau$ are iid distributed with a mean $\mu_1$ and variance $\sigma_1$. In real life situations, $\tau$ is not known. The objective of change point estimation is to estimate $\tau$. This means that step changes are examined in process levels rather than drifts. The variance may change along with the mean level. No specific probability distribution for the observations $X_t$ is assumed for the following:

$$X_t = \mu_0 + \epsilon_t, \text{ for } t < \tau \quad \epsilon_t \approx \{0, \sigma_0^2\}, \text{ for } t < \tau$$
$$\mu_1 + \epsilon_t, \text{ for } t \geq \tau \quad \{0, \sigma_1^2\}, \text{ for } t \geq \tau$$

wherein $0 \leq t \leq T$, with T being the end of the considered time interval. Practically, T will correspond to the last observed data point. In addition, without loss of generality, it is assumed that $\mu_0 = 0$ and $\sigma_0 = 1$. The idea is that for each point in the horizon an estimate of the process point to the right and to the left of the considered point is calculated. At the real change point this difference, $\Delta_t$, is expected to be maximum, provided that there has been a change at the mean level. For each of the following versions used to estimate the change point time, it turns out that the expected difference is maximized at the real change point, equaling the amount of shift in the process. The magnitude of differences is an indication as to whether there is a change. Therefore, the present invention defines $\hat{\tau}$ as the estimated change point time which has the maximum $|\Delta_t|$. In order to give alternative change point locations, two neighborhoods are explored. One is the order statistic neighborhood, $O_{(i)}(\hat{\tau})$, having i time points with the highest $|\Delta_t|$'s. The second neighborhood is the time neighborhood, $T_{(k)}(\hat{\tau})$ plus minus k time units of the original $\hat{\tau}$.

The first version of estimating the change point time is performed by taking the average of points before and after a point. Version one is defined as:

$$\Delta_t = \bar{X}_{tr} - \bar{X}_{tl}, \quad 0 < t < T, \text{ wherein}$$

$$\bar{X}_{tr} = \frac{1}{T-t+1} \sum_{j=t}^{T} X_j \text{ and } \bar{X}_{tl} = \frac{1}{t} \sum_{j=0}^{t-1} X_j$$

In this version $\bar{X}_{tr}$ is the average of points to the right of the point, $\bar{X}_{tl}$ is the average of points to the left of the points, and $X_j$ is the $j^{th}$ observation. The mean of the $\Delta_t$ is a function of $\mu_0, \mu_1, t, \tau$ and T, while the variance of $\Delta_t$ is a function of $\sigma_0, \sigma_1, t, \tau$ and T. In particular, the relationship of the mean is defined as:

$$E[\Delta_t] = \left( I(t \geq \tau) \frac{\tau}{t} + I(t < \tau) \frac{T - \tau + 1}{T - t + 1} \right)(\mu_1 - \mu_0),$$

I is the indicator function which takes a value of 1 if the expression is true or otherwise a 0. Note that $E[\Delta_t]$ is maximized at $t = \tau$ and that $E[\Delta_\tau] = \mu_1 - \mu_0$. Hence, $\Delta\hat{\tau}$ is the estimator for the amount of shift in the process. The relationship of the variance is defined as:

$$\text{Var}[\Delta_t] = I(t \geq \tau) \left\{ \left( \frac{1}{T-t+1} + \frac{t-\tau}{t^2} \right) \sigma_1^2 + \frac{\tau}{t^2} \sigma_0^2 \right\} +$$
$$I(t < \tau) \left\{ \left( \frac{\tau - t}{(T-t+1)^2} + \frac{1}{t} \right) \sigma_0^2 + \frac{T-\tau+1}{(T-t+1)^2} \sigma_1^2 \right\}$$

The mean for the $\Delta_t$'s does not depend on the variance of the process or its change. Similarly the variance of $\Delta_t$ does not depend on the mean process level or its change. When there is no change, then $\mu_1 = \mu_0$ and $\sigma_1 = \sigma_0$. Therefore, $$E[\Delta_t | \text{no change}] = 0; \quad \text{Var}[\Delta_t | \text{no change}] = \frac{T+1}{t(T-t+1)} \sigma^2$$

The second version of estimating the change point time is performed by taking the EWMA of points with the smoothing constant $\lambda$ before and after a point. The starting value from the left is $\mu_0$, while from the right, the starting value is either the last observation or the left EWMA at the last point. These expressions are based on the last observation being the beginning of the right EWMA. Version two is defined as:

$$\Delta_t = EWMA_{tr} - EWMA_{tl}, \text{ with } 0 < t < T, \text{ wherein}$$

$$EWMA_{tr} = \lambda \sum_{j=t}^{T-1} (1-\lambda)^{j-t} X_j + (1-\lambda)^{T-t} X_t$$

and $$EWMA_{tl} = \lambda \sum_{j=l}^{T-1} (1-\lambda)^{t-j-1} X_j + (1-\lambda)^{t-1} X_0$$

Similar to the first version where the mean was used to estimate the process level before and after the point where the difference is formed, the expected value of the difference in version two gets maximized at the real change point, where it becomes equal to the amount of shift in the process. The expected value and the variance expressions are given as follows:

$$E[\Delta_t] = (1 - \lambda)^{|t-\tau|}(\mu_1 - \mu_0);$$

$$\text{Var}[\Delta t] = \frac{\lambda}{2-\lambda} \left( \{I(t \geq \tau)[2\sigma_1^2 + (1-\lambda)^{2(t-\tau)}(\sigma_0^2 - \sigma_1^2)]\} + \right.$$

$$I(t < \tau)[2\sigma_0^2 + (1-\lambda)^{2(\tau-t)}(\sigma_1^2 - \sigma_0^2)] -$$

$$\left. (1-\lambda)^{2(t-1)}\sigma_0^2 + \frac{2}{\lambda}(1-\lambda)^{2(T-t)+1}\sigma_1^2 \right);$$

$$E[\Delta_t|\text{no change}] = 0;$$

and $$\text{Var}[\Delta_t|\text{no change}] = \left( \frac{\lambda}{2-\lambda} \right)[2 - (1-\lambda)^{2t-2}] +$$

$$\left( \frac{2}{2-\lambda} \right)(1-\lambda)^{2T-2t+1}.$$

The third version of estimating the change point time is performed by taking the EWMA for the series before the point and uses the mean to the right of the point. The starting value for the EWMA is the historical process mean defined as:

$$\Delta_t = \bar{X}_{tr} - EWMA_{tl}, \text{ where } 0 < t < T.$$

The expected value and the variance expressions are defined as follows:

$$E[\Delta_t] = \left( I(t \geq \tau)(1-\lambda)^{t-\tau} + I(t < \tau)\left( \frac{T-\tau+1}{T-t+1} \right) \right)(\mu_1 - \mu_0);$$

$$\text{Var}[\Delta_t] =$$

$$I(t \geq \tau) \left( \frac{1}{T-t+1} \sigma_1^2 + \frac{\lambda}{\lambda-2} ((1-\lambda)^{2(t-\tau)} - 1) \sigma_1^2 + \right.$$

$$\frac{\lambda}{\lambda-2} ((1-\lambda)^{2(t-1)} - (1-\lambda)^{2(t-\tau)})\sigma_0^2 \right) +$$

$$\left( \frac{\tau-t}{(T-t+1)^2} + \frac{\lambda}{\lambda-2} ((1-\lambda)^{2(t-1)} - 1) \right)\sigma_0^2 \right).$$

As with versions one and two, the expected $\Delta_t$ is maximized at the real change point $\tau$, at which point it equals the shift in the process level. Again, as with versions one and two, the $\Delta_t$ is zero when there is no change in the level of the process. This relationship is shown as:

$$E[\Delta_t|\text{no change}] = 0; \text{ and}$$

$$\text{Var}[\Delta t|\text{no change}] = \frac{1}{T-t+1} + \left( \frac{\lambda}{2-\lambda} \right)[1 - (1-\lambda)^{2t-2}].$$

In extensive simulation studies, version three has been found to be preferable over versions one and two, because it predicts the real change point more accurately, particularly for small amounts of change, which are important for the illustrative embodiment. Another advantage of version three is that it is less sensitive to the beginning of the considered time horizon. Intuitively, version three performs better because it utilizes the information about the historical process level in the form of an EWMA starting constant and optimally utilizing all of the information after the change point by weighing them equally.

After estimating a change point time using either versions one, two, or three, the change point estimator has to determine the possibility of whether there really was a change point or was the alarm falsely activated. If there is no change point time, then the present invention devises thresholds within which the $\Delta_t$'s will remain $(1-\alpha)^*100\%$ of the time if there is no change. These thresholds are a guarding mechanism against false alarms. Typically, the level of $\alpha$ (usually $\alpha$ is set at 0.05 or 0.10) is decided a priori. The threshold value for each t is calculated using the well known Bonferroni inequality.

The variance as well as the mean vector for the $\Delta_t$'s are obtained from the expressions introduced in earlier by setting $\mu_1\mu_0$ and $\sigma_1=\sigma_0$. The Bonferroni intervals are constructed such that:

$$\text{pr}(|\Delta_1| \leq d_1, \ldots |\Delta_t| \leq d_t, \ldots |\Delta_{T-1}| \leq d_{T-1}|\mu_1=\mu_0, \sigma_1=\sigma_0) \geq 1-\alpha; \text{ and}$$

An individual confidence interval with $\alpha/T$ is constructed for each $\Delta_t$ under the null hypothesis that there is no change. Resulting intervals have different lengths according to t. The inner $\Delta_t$'s have smaller threshold values since they have smaller variance. The distribution of $\Delta_t$'s is assumed to be normal with t dependent on the mean and variance. This assumption can be justified by noting that the $\Delta_t$'s are linear combinations of independent random variables with finite variances and that by Liapunov's Central Limit Theorem for the sum of independent random variables will be approximately normally distributed in the following manner:

$$\Phi(z^*) = 1 - \frac{(\alpha/2)}{T-1},$$

wherein $\Phi$ is the cdf of normal distribution. The threshold is defined as:

$$\text{threshold}_t = z^* \sqrt{\text{Var}[\Delta_t|\text{no change}]}.$$

The thresholds for the $\Delta_t$'s given the time horizon T and the type 1 error rate $\alpha$ are determined in the following fashion: $\alpha$ denotes the maximum percent of time that needed to find a change point when there is no change. The higher the $\alpha$, the smaller the thresholds and the narrower the region within which a false alarm is declared. Bonferroni simultaneous confidence intervals are quite conservative, hence the real chance taken in declaring a change when there is none is much smaller than the specified $\alpha$.

If the change point estimator estimates that there is a change point, then it determines whether there are any other likely change point times. Any other likely change point times are determined by defining neighborhoods for the change point time estimate $\hat{\tau}$. In the present invention there are two neighborhoods. The first neighborhood for the change point time estimate $\hat{\tau}$ is defined as:

k time neighborhood $T_{(k)}$ ($\hat{\tau}$) including $\pm$k time points, wherein for example if $\hat{\tau}$ was the $20^{th}$ point and k was selected by the engineer as 2, the 2 time neighborhood would include the $18^{th}$, $19^{th}$, $20^{th}$, $21^{st}$, and $22^{nd}$ points. The second neighborhood for the change point time estimate $\hat{\tau}$ is defined as:

i order statistic neighborhood, $O_{(i)}$ ($\hat{\tau}$) including the i time points with the largest $|\Delta_t|$'s.

Any of the other likely change point times are then used to match the dates of the change point times to any possible changes in the product variables that occurred during the manufacturing process. For example, a screw change in the extrusion line, a change in the standard operating procedure for the plastic production, or a change in raw material, would be possible causes to be matched with the candidate change point(s). The change point estimator then identifies a source for the change in the process. Next, a corrective action is then sent to the engineer to remedy the change. If there was no change point time, then the change point estimator inquires whether the alarm continues to register. If the alarm does persist, then the change point estimator acquires more data and repeats the estimation of a change point time according to one of the three versions.

It is therefore apparent that there has been provided in accordance with the present invention, a system and method for monitoring a manufacturing process and estimating a time change point that fully satisfy the aims, advantages and objectives hereinbefore set forth. The invention has been described with reference to several embodiments, however, it will be appreciated that variations and modifications can be effected by a person of ordinary skill in the art without departing from the scope of the invention.

We claim:

1. A system for estimating a change point time in a manufacturing process producing various products made on multiple lines in several lots, the system comprising:
    a test device for measuring a plurality of product variables representing various properties of the manufactured products for each product made on a line in a lot;
    a storage device for storing the plurality of measured properties from the test device in various groupings of lots, products, and lines;
    a detector for detecting changes occurring in the groupings of properties in the storage device for each product made on a line in a lot, the detector comprising at least one control chart containing control limits for each respective grouping, the detector combining the plurality of measured properties in each grouping and determining if a control limit has been exceeded for any product made on a line in a lot;
    a change point estimator for estimating a change point time for each grouping that has exceeded a control limit, the change point time indicating when a process change occurred which subsequently caused the control limit to be exceeded, the change point estimator estimating the change point time by estimating each point of the manufacturing process with a combination of an exponentially weighted moving average (EWMA) and an average of points before and after each particular point in time, the change point time being the particular point in time with a maximum absolute difference between at least one of the EWMA of points before and after the particular point, the average of points before and after the particular point and the EWMA of points before the particular point and the average after the particular point; and
    a diagnostic analyzer coupled to the detector and the change point estimator for helping to identify sources causing the control limit to be exceeded, and to provide a basis for selecting actions to correct the sources.

2. The system according to claim 1, wherein the change point time is the particular point in time in the manufacturing process with the maximum absolute difference between the EWMA of points before and after.

3. The system according to claim 1, wherein the change point time is the particular point in time in the manufacturing process with the maximum absolute difference between the EWMA of points before and the average after.

4. The system according to claim 1, further comprising means for determining other likely change point times for each grouping.

5. The system according to claim 4, further comprising means for matching the other likely change point times to changes occurring in any factor of the manufacturing process.

6. The system according to claim 1, further comprising means for deciding whether the control limit has been exceeded by error.

7. A method for estimating a change point time in a manufacturing process producing various products made on multiple lines in several lots, the method comprising the steps of:
    measuring a plurality of product variables representing various properties of the manufactured products for each product made on a line in a lot;
    storing the plurality of measured properties in various groupings of lots, products, and lines;
    detecting changes occurring in the groupings of properties for each product made on a line in a lot using at least one control chart, each of the at least one control charts containing control limits for each respective grouping;
    combining the plurality of measured properties in each grouping and determining if a control limit has been exceeded for any product made on a line in a lot;
    estimating a change point time for each grouping that has exceeded a control limit, the change point time indicating when a process change occurred which subsequently caused the control limit to be exceeded, the change point time estimated by estimating each point of the manufacturing process with a combination of an exponentially weighted moving average (EWMA) and an average of points before and after each particular point in time, the change point time being the particular point in time with a maximum absolute difference between at least one of the EWMA of points before and after the particular point, the average of points before and after the particular point and the EWMA of points before the particular point and the average after the particular point; and
    identifying sources causing the control limit to be exceeded.

8. The method according to claim 7, wherein the change point time is the particular point in time in the manufacturing process with the maximum absolute difference between the EWMA of points before and after.

9. The method according to claim 7, wherein the change point time is the particular point in time in the manufacturing process with the maximum absolute difference between the EWMA of points before and the average after.

10. The method according to claim 7, further comprising determining other likely change point times for each grouping.

11. The method according to claim 10, further comprising matching the other likely change point times to changes occurring in any factor of the manufacturing process.

12. The method according to claim 7, further comprising deciding whether the control limit has been exceeded by error.

* * * * *